July 14, 1925. Re. 16,111

L. AUSTER ET AL

BATHING CAP

Original Filed Sept. 4, 1923

WITNESSES

W. A. Williams

Harry P. Deidel

INVENTORS

Louis Auster and Marie Auster.

BY Munn & Co

ATTORNEYS

Reissued July 14, 1925. Re. 16,111

UNITED STATES PATENT OFFICE.

LOUIS AUSTER AND MARIE AUSTER, OF NEW YORK, N. Y.

BATHING CAP.

Original No. 1,482,723, dated February 5, 1924, Serial No. 660,797, filed September 4, 1923. Application for reissue filed April 20, 1925. Serial No. 24,669.

*To all whom it may concern:*

Be it known that we, LOUIS AUSTER and MARIE AUSTER, citizens of the United States, and residents of New York, in the county and State of New York, have invented certain new and useful Improvements in Bathing Caps, of which the following is a specification.

This invention relates to bathing caps and water guards therefor and is more particularly directed to an improvement in that type of device described and claimed in our Patent No. 1,465,706, dated August 21, 1923.

Bathing caps as constructed do not protect the hair or ears of the bather from water and this is due to the fact that the irregular contour of the head more particularly defined by crevices at points behind the ears and at the nape of the neck, permits the ingress of water to the interior of the bathing cap with consequent saturation of the hair and water in the ears.

It is an object of this invention when employed in conjunction with a bathing cap or when incorporated in a bathing cap as a unitary structure to prevent the passage of water to the interior of the cap by compensating for the irregular contour of the head at points behind the ears.

Another object of the invention is the provision of a device to not only exclude water from the hair of the bather but to protect the ears from water and reduce direct pressure of a bathing cap upon the ears.

A further object of the invention is the provision of a reliable device for pocketing the ears of a bather and thus sealing the ears against water.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

Figure 1:
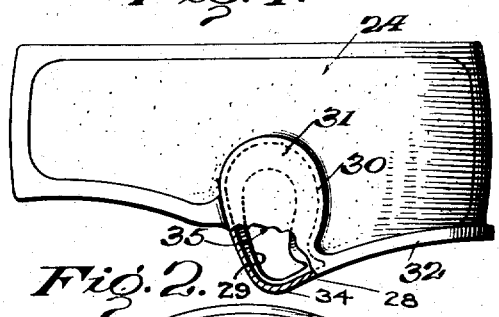
Figure 1 is a side view of an elastic band having incorporated therein our improved water guard for the ears of a bather.

Referring more particularly to the drawings, 24 designates an annular band of elastic material adapted to be drawn over the head to encircle that portion of the head between the forehead and the nape of the neck and embracing the ears upon opposite sides of the head. The lower edge 25 of the band is cut along irregular lines so that the forward portion 26 which engages around the forehead is narrower than the rear portion 27.

Portions 28 depend from the lower edge of the band adjacent points where the band engages the ears and the depending portions are cut out to provide ear-receiving openings 29. The periphery of the openings engages that portion of the ear which is directly connected with the head of the bather. A rib 30 encircles the opening in spaced relation with the periphery of the opening 29 and is raised sufficiently above the periphery of the band to neatly pocket the ear. By spacing the rib 30 from the periphery of the opening a flange 31 is formed upon which the ear is seated when the band has been applied to the head of a bather.

The ribs 30 conform to the contour of the ear and are connected adjacent their lower ends by a rib 32 which is formed integrally with the band 24 at its lower end and is carried around the rear 27 of the band and engages the nape of the neck.

Figure 7:
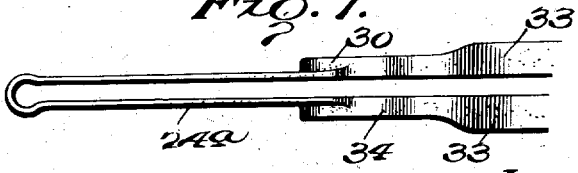
Figure 7 is an end view of the guard shown in Figures 1 to 6 inclusive.

As shown more particularly in Figure 7 a portion of the rib 32, as shown at 33, adjacent the point where it is connected to the encircling ribs 30, is elevated beyond the rib 32 and beyond the height of portions 34 of the laterally extending ribs 30. The object of elevating these portions of rib 32 is to cause the rib to seat within the slight recess formed at the rear of the ears either by the direct pressure of a cap or by the tension exerted by the materials of the band when it is stretched over the head and thereby provide an absolute closure to prevent water from seeping beneath the band and saturating the hair and entering the ears. An elastic member 35 formed of substantially the same material as the band per se is molded integrally upon the outer periphery of the rib 30 as shown more particularly in Figures 1 to 3. In order to pocket the ears and seal the same against water the ribs 30 and 32, when the band 24 has been placed upon the head of the bather under a slight tension, tend to fall into any recesses due to the irregular contour of the head and seal the band and pocket from ingress of water. The portion 33 is especially adapted to be depressed in the hollows at the rear of the ears.

Instead of the elastic band as shown in Figure 1, a bathing cap 36 may be provided with the ribs 30, the annular flange 31, the rib 32, depending portions 34 and the elastic closures 35 which cooperate with the ribs 30 to form pockets for sealing the ears against water. The two structures are similar with the exception that the band 24 is not formed into a complete cap. The result obtained for the protection of the ears is identical with the results disclosed by the form shown in Figure 1. The bathing cap has the additional feature of preventing saturation of the hair.

Figure 4:
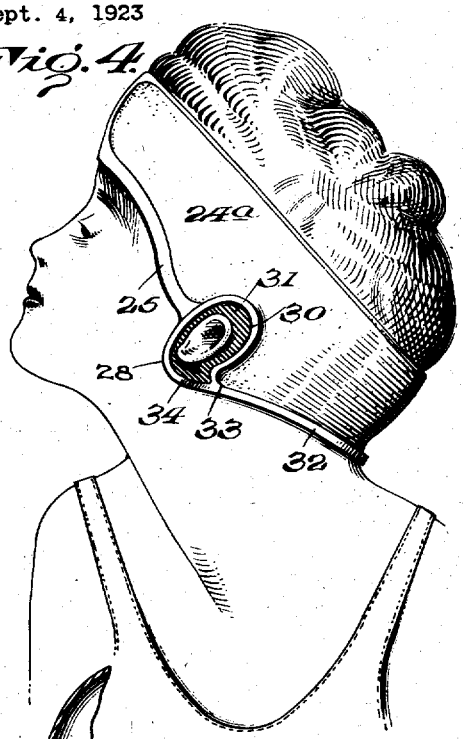
Figure 4 is a modified form of the guard adapted to be employed in connection with a bathing cap and shown applied to the head of a bather.
Figure 2:
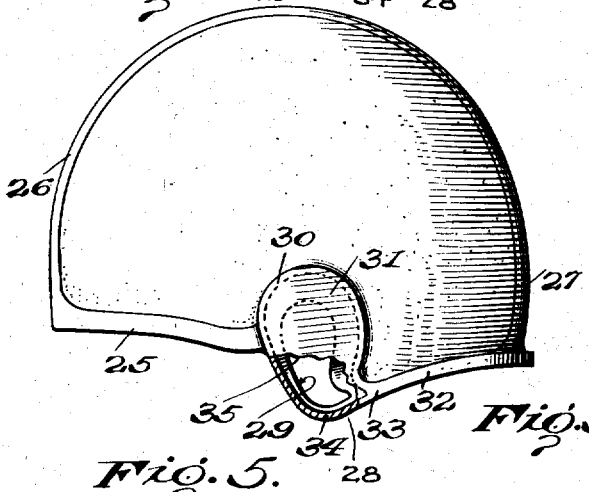
Figure 2 is a side view of a bathing cap equipped with our improved water guard.
Figure 3:
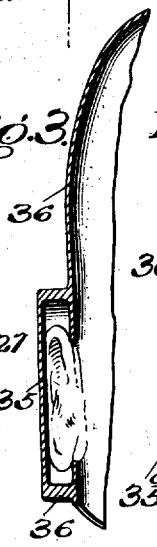
Figure 3 is a vertical section of the guard embodied in a bathing cap as shown in Figure 2.
Figure 6:
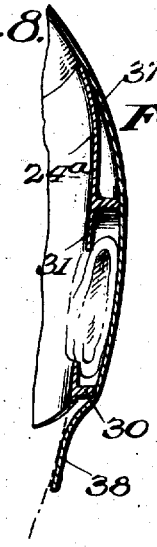
Figure 6 is a transverse vertical section of the guard shown in Figures 4 and 5 showing the function of the guard when used in connection with a bathing cap.
Figure 5:
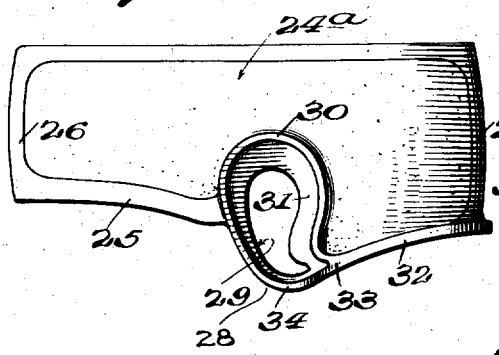
Figure 5 is a detail side view of the elastic band and guard illustrated in Figure 4.

Referring more particularly to the Figures 4, 5 and 6, a band 24[a] is provided having the depending portion 34, encircling ribs 30, flange 31 and ribs 32 which correspond in detail to the similar members of Figures 1 and 2. This band is adapted to be worn in conjunction with a bathing cap 37 which cooperates with the ribs 30 to form a pocket and seal the ears against water. In this construction the band is applied to the head as shown in Figure 4 with the ears inserted through the openings 29 and seated upon the flange 31 and embraced by the ribs 30. The enlarged portion 33 where the rib 32 is connected to the rib 30 is adapted to be forced into the depression behind the ears by the action of the bathing cap 37. A cap is adapted to be drawn over the head of the bather with the lower edge 38 located below the lower edge of the band 24[a]. The ribs 30 and 32 tend to force the bathing cap outwardly from the side of the head and not only pocket the ears but causes the edge 38 of the cap to snugly engage the head of the bather and seal the cap against the passage of water. The pressure of the cap on the raised portion 33 of the rib 32 forces that portion into the recess behind the ears while the rib 32 snugly engages the nape of the neck and fits in all depressions so that the band 24 and its elements cooperate with the cap to cause the cap to engage the head in a manner to prevent passage of water to the interior of the cap.

Figure 8:
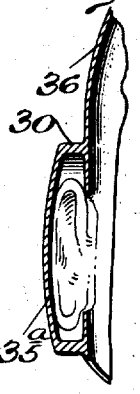
Figure 8 is a slightly modified form of the guard shown in Figures 1 to 3 inclusive.

A further modified form is shown in Figure 8 in which the sealing member 35[a] which is formed integrally with the rib 30 and cooperates with the rib to form a sealed pocket for the ear is bulged outwardly in order to provide a greater air pocket for the ear. This concave closure 35[a] may be employed in connection with either the band 24 of Figure 1 or the bathing cap 36 of Figure 2.

It will be appreciated that the pockets which project laterally from the sides of the bathing cap structure as shown in Figures 1, 2, 3 and 8 and which are described as being composed of an ear embracing rib 30 and a cover 35 connected with the outer end of the rib may be considered as pockets forming an integral part of the body structure of the cap with the side walls of said pockets thickened to form reinforcing ribs 30 for aiding in eliminating pressure on the ears, with the pockets located between a band at the periphery of the head receiving opening of the cap and the top of the cap.

Due to the elasticity of the materials from which the cap structure is manufactured an inherent function of the device is that when the cap is forced upon the head of the wearer the portion of the cap, and more particularly the portions of the band designated by the numerals 25 and 32 at the periphery of the head receiving opening, exert a pull in opposite directions away from the ear pockets and towards the front and rear of the cap and force the peripheral portions of the ear pockets, especially the lowest extremities which are also confined within the body structure of the cap as a unitary part and above the marginal band in snug engagement with the head to aid in preventing the seepage of water at these points and to aid in relieving pressure on the ears.

What we claim is:

1. A water guard comprising an elastic member adapted to be worn on the head of a bather having openings to receive the ears, ribs entirely encircling the openings and a rib connecting the encircling ribs and located at the rear of the elastic member.

2. A water guard comprising an elastic member adapted to be worn on the head of a bather having portions depending at opposite points from the lower edge of said member, the member being provided with oppositely disposed openings extending into the depending portions, ribs completely encircling the openings and a rib connected to the lower edge of the encircling ribs and formed integrally with that portion of the elastic member which engages the back of the neck of the bather.

3. A water guard comprising an elastic member adapted to be worn on the head of a bather having at opposite points ear receiving openings, annular ribs encircling and spaced from the peripheries of the openings, the lower ends of the ribs projecting beyond the bottom edge of the elastic member, and a rib formed integrally with the elastic member adjacent the bottom edge thereof and connected at its ends to the encircling ribs.

4. A water guard comprising an elastic member adapted to be worn on the head of a bather having openings to receive the ears, ribs entirely encircling the openings and a rib connecting the encircling ribs and located at the rear of the elastic member, and means cooperating with the encircling ribs for forming a pocket to exclude water from the ears of the bather.

5. A water guard comprising an elastic member adapted to be worn on the head of a bather having openings to receive the ears, ribs entirely encircling the openings and a rib connecting the encircling ribs and located at the rear of the elastic member, a closure formed of elastic material and connected to the outer edge of the encircling ribs for forming a pocket to exclude water from the ears of a bather.

6. A water guard comprising an elastic member adapted to be worn on the head of a bather having openings to receive the ears, ribs entirely encircling the openings, and means cooperating with the encircling ribs for forming a pocket to exclude water from the ears of the bather.

7. A water guard comprising an elastic member adapted to be worn on the head of a bather having openings to receive the ears, ribs entirely encircling the openings, means cooperating with the encircling ribs for forming a pocket to exclude water from the ears of the bather, and means connected with the ribs for causing the ear encircling ribs of the pockets to snugly embrace the head adjacent the ears to exclude water from the ears.

8. An elastic water guard for the head of a bather having ear receiving openings at its opposite sides, ribs entirely surrounding the openings, and snugly conforming to the inequalities of the human head entirely around the ears.

9. A bathing cap formed of elastic material provided with a head receiving opening at its lower end and adapted to cover the head of the wearer to include the ears above the periphery of the head receiving opening, the side walls of the cap having ear receiving openings formed therein and, confined within the body of the cap above the periphery of the head receiving opening, and raised covers forming pockets to enclose the ears, projecting laterally and directly from the walls and embracing said openings, said pockets forming an integral part of the cap and being so included in the body structure of the cap at points above the periphery of the head receiving opening that when the cap is applied to the head and the elastic material stretched circumferentially of the head receiving opening the lower extremities of the pockets will be forced inwardly to engage snugly the head adjacent the ears to aid in excluding water from the ears.

10. A bathing cap formed of elastic material provided with a head receiving opening at its lower end and adapted to cover the head of a wearer to include the ears above the periphery of the head receiving opening, the side walls of the cap having ear receiving openings formed therein and confined within the body of the cap above the periphery of the head receiving opening, and raised covers forming pockets to enclose the ears, projecting laterally and directly from the walls and embracing said openings, said pockets forming an integral part of the cap at points above the periphery of the head receiving opening that when the cap is applied to the head and the elastic material stretched circumferentially of the head receiving opening, the lower extremities of the pockets will be forced inwardly to engage snugly the head adjacent the ears to aid in excluding water from the ears, said pockets being formed of an annular side wall and a top, the side wall of each pocket being thickened for maintaining the top of the pocket in spaced relation with the outer surface of the cap to relieve pressure on the ears of a bather.

LOUIS AUSTER.
MARIE AUSTER.